Mar. 6, 1923.
E. X. SCHMIDT
FLUID METER
Filed Nov. 18, 1920
1,447,437
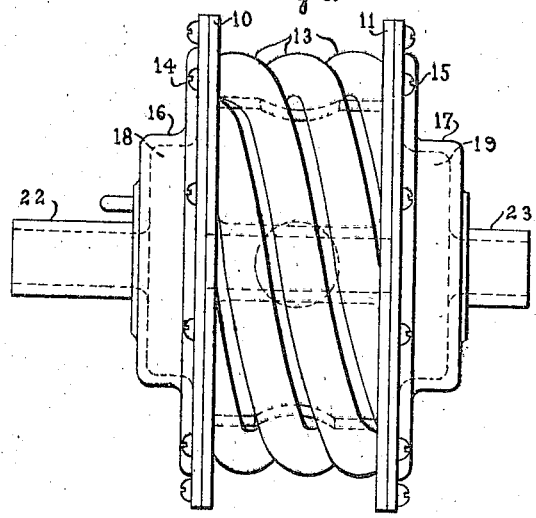
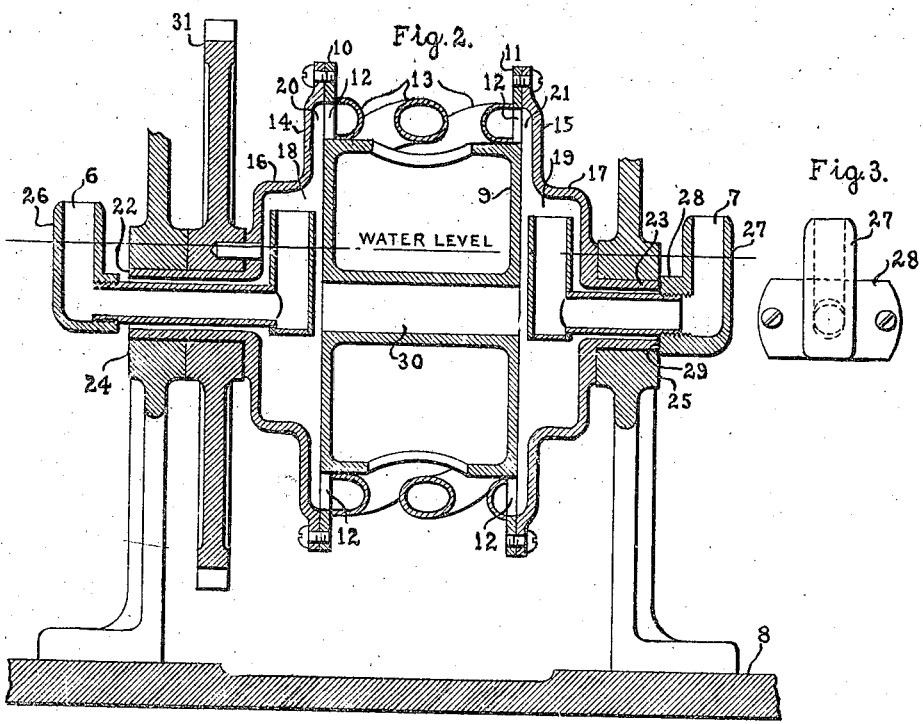
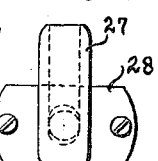
Inventor
Edwin X. Schmidt
By Frank H. Hubbard
Attorney.

Patented Mar. 6, 1923.

1,447,437

UNITED STATES PATENT OFFICE.

EDWIN X. SCHMIDT, OF MILWAUKEE, WISCONSIN, ASSIGNOR TO THE CUTLER-HAMMER MFG. CO., OF MILWAUKEE, WISCONSIN, A CORPORATION OF WISCONSIN.

FLUID METER.

Application filed November 18, 1920. Serial No. 424,823.

*To all whom it may concern:*

Be it known that I, EDWIN X. SCHMIDT, a citizen of the United States, residing at Milwaukee, in the county of Milwaukee and State of Wisconsin, have invented new and useful Improvements in Fluid Meters, of which the following is a full, clear, concise, and exact description, reference being had to the accompanying drawing, forming a part of this specification.

This invention relates to fluid meters and more particularly to meters of the wet displacement type.

Such meters as heretofore constructed, while satisfactory for ordinary purposes, nevertheless involve certain features which tend toward slight inaccuracy of performance, whereby the same are inadapted to certain classes of service wherein a very high degree of accuracy is required, and the present invention has among its objects that of obviating such inaccuracy of meters of the type aforementioned.

Another object is that of improving generally the structural and operative characteristics of such meters.

Other objects and advantages will hereinafter appear.

In a conventional form of wet displacement meter a drum or the like is mounted for rotation about a horizontal axis within a tank containing sealing liquid, the drum having an internal chamber in open communication with the source of fluid to be metered and with the liquid within the tank. The drum is also provided with circumferentially extending passages communicating with the chamber of the drum in a relation such that upon rotation of the latter a quantity of the fluid to be metered is entrapped between slugs or pistons of sealing liquid within each of the passages and thereafter expelled from the meter, the fluid being collected by suitable means and the liquid being discharged into the tank. During such operation the liquid circulates freely between the drum and the tank whereas obviously the volume of fluid entrapped at each rotation of the drum is determined by the height of the liquid within the chamber of the latter. Means are ordinarily provided for maintaining substantially a constant height of liquid within the tank whereas in theory the liquid within the chamber will be automatically maintained at the same level owing to the aforementioned open communication therebetween.

However, owing to the relatively rapid circulation of liquid between the drum and the tank the rate of reflux of fluid to the drum chamber tends to fall below the rate of discharge of liquid therefrom, whereby the level of liquid in the chamber tends to fall below that of the tank, such tendency being more marked for the higher rotative speeds of the drum, whereby the device is inadapted to meter accurately under conditions of variable speed.

Also where the fluid is of such character as to undergo absorption, involving all or certain of its constituents, by the sealing liquid a further tendency to error is introduced, the amount of such absorption being dependent upon numerous variable and indeterminate factors.

According to the present invention it is proposed to practically eliminate the aforementioned circulation of the sealing liquid between the tank and the drum, a bypass of ample dimensions being provided for conducting the discharged liquid back directly to the drum chamber whereby the aforementioned tendency of the liquid level of said chamber to vary from that of the tank is removed. A free communication between the tank and the drum chamber is, however, maintained to provide for compensation for certain slight losses of the active portion of the sealing fluid due to possible leakage, vaporization or other cause. Such active portion of the sealing fluid being thus used repeatedly and practically continuously without material loss or addition of fresh fluid, becomes quickly saturated as regards any of the fluid constituents capable of absorption thereby, whereby further absorption is prevented and inaccuracy due to such cause is eliminated.

In the accompanying drawing wherein is illustrated an embodiment of the invention, Fig. 1 is a side elevational view thereof, the liquid tank being omitted;

Fig. 2 is a vertical sectional view of the device including the tank and contents; while Fig. 3 is an end view illustrating certain elements of the device more in detail.

In the drawing, a drum having a fluid inlet 6 and a fluid outlet 7 is mounted within a liquid containing tank 8 for rotation about its own major axis, the latter being arranged horizontal.

More particularly, the drum comprises a substantially cylindrical body portion 9 having terminally located peripheral flanges 10 and 11 provided with like numbers of openings 12, while a similar number of open ended helical tubes 13 are arranged about said drum and terminally connected to the respective flanges at the several openings of the latter. Flared end plates 14 and 15 are secured to the outer sides of the respective flanges 10 and 11 and are provided with centrally located bosses 16 and 17 forming respectively, in conjunction with the adjacent heads of the drum, an inlet chamber 18 and an outlet chamber 19 having respectively annular passages 20 and 21 communicating with the several openings of the respective flanges 10 and 11. Said end plates are further provided respectively with centrally located hollow journals 22 and 23 for rotatable mounting of the drum within suitable supporting brackets 24 and 25. Substantially similar U-tubes 26 and 27 having their central portions located within and in spaced relation to the respective journals 22 and 23 serve respectively to conduct the fluid to the inlet chamber 18 and from the outlet chamber 19. The tube 26 is spaced from the interior of the journal 22 at all points, thereby providing for open communication between the inlet chamber 18 and the interior of the tank 8 below the level of the contained liquid, whereas the tube 27 includes a hollow boss 28 having a shoulder 29 to snugly engage the adjacent end of the journal 23 for preventing direct communication between the outlet chamber 19 and the interior of the tank.

The body portion 9 of the drum is further provided with a centrally located enlarged passage 30 affording direct communication between the inlet and outlet chambers below the level of the contained liquid.

In the operation of the structure aforedescribed, it is obvious that the sealing liquid which is discharged into the outlet chamber 19 is prevented from flowing into the tank, but on the other hand such liquid is free to return directly to the inlet chamber through the aforementioned passage 30 which is constructed of such size as to insure equalization of the heights of the liquid in the two chambers. There is thus no material tendency for the level of liquid within the inlet chamber to vary from that within the tank whereas the aforedescribed open communication between said inlet chamber and tank provides automatic compensation for any variation in the quantity of liquid within the drum due to vaporization, leakage through the bearings or other cause.

Also by the foregoing construction and arrangement wherein the same sealing liquid is used repeatedly, inaccuracy of the meter due to absorption of the metered fluid by the liquid is obviated.

If desired, a gear 31 may be rigidly secured to the drum in the manner illustrated, or otherwise, to provide for power operation of the drum, whereby the device is adapted to act as a metering pump.

What I claim as new and desire to secure by Letters Patent is:

1. A wet displacement pump comprising piston liquid and a container therefor movable to cause circulation of said liquid therewithin, said container having means to entrap fluid between portions of the liquid upon movement of said container and also having therein a return flow passage for the liquid.

2. A device of the character set forth comprising a rotatable member containing a sealing liquid and having a passage to convey therethrough fluid entrapped between quantities of the sealing liquid said member further having therein a complete circulating system for the fluid so utilized.

3. A self contained pump comprising piston liquid, a container therefor rotatable to cause circulation of said liquid therewithin, said container having means to entrap fluid between portions of said liquid and also having a return passage for the liquid wholly within said container, and means to compensate for losses of the piston liquid due to absorption thereof by such fluid.

4. A device of the character set forth comprising a rotatable member containing a sealing liquid and having a passage to conduct therethrough fluid entrapped between quantities of the sealing liquid and means for maintaining a given height of sealing liquid within said rotatable member, the latter further having therein a return flow passage for the liquid utilizing to entrap such fluid.

5. A wet displacement meter comprising a rotatable drum having end chambers to contain both sealing liquid and fluid to be metered, and means providing connecting passages for said chambers including a passage to conduct fluid entrapped between quantities of the sealing liquid from one to the other of said chambers and a passage providing for direct return flow of the sealing liquid so utilized.

6. A wet displacement meter comprising a rotatable drum having end chambers to contain both sealing liquid and fluid to be metered, and means providing connecting passages for said chambers including a passage to conduct fluid entrapped between quantities of the sealing liquid from one to the other of said chambers and a passage for direct return flow of the sealing liquid so utilized and means for maintaining a constant height of sealing liquid within said chambers.

7. In a wet displacement meter, the combination with a tank containing sealing liquid, of a drum rotatably carried within said tank and having end chambers containing sealing liquid, one of said chambers being connected with a source of fluid to be metered and the other of said chambers having a stationary discharge orifice for such fluid, said drum having means providing a plurality of connecting passages for said chambers including passages to conduct fluid entrapped between quantities of the sealing liquid from one to the other of said chambers and a passage providing for definite return flow of the liquid so utilized.

8. In a wet displacement meter, the combination with a tank containing sealing liquid at a given height, of a drum rotatably carried within said tank and having end chambers containing sealing liquid, one of said chambers being connected with a source of fluid to be metered and the other of said chambers having a stationary discharge orifice for such fluid, said drum having means providing a plurality of connecting passages for said chambers including passages to conduct fluid entrapped between quantities of the sealing liquid from one to the other of said chambers and a passage providing for direct return flow of the liquid so utilized and means preventing direct communication between certain of said chambers and said tank.

9. In a wet displacement meter, the combination with a tank containing sealing liquid at a given height, of a drum rotatably carried within said tank and having end chambers containing sealing liquid, one of said chambers being connected with a source of fluid to be metered and the other of said chambers having a stationary discharge orifice for such fluid, said drum having means providing a plurality of connecting passages for said chambers including passages to conduct fluid entrapped between quantities of the sealing liquid from one to the other of said chambers and a passage providing for direct return flow of the liquid so utilized, means providing a single opening for direct communication between said chambers and said tank.

10. In a wet displacement meter, the combination with a tank containing sealing liquid at a given height, of a drum rotatably carried within said tank and having end chambers containing sealing liquid, one of said chambers being connected with a source of fluid to be metered and the other of said chambers having a stationary discharge orifice for such fluid, said drum having means providing a plurality of connecting passages for said chambers including passages to conduct fluid entrapped between quantities of the sealing liquid from one to the other of said chambers and a passage providing for direct return flow of the liquid so utilized, means providing for direct communication between said inlet chamber and said tank and means preventing direct communication between said discharge chamber and said tank.

In witness whereof, I have hereunto subscribed my name.

EDWIN X. SCHMIDT.